(12) United States Patent
Mondal

(10) Patent No.: US 8,645,548 B2
(45) Date of Patent: Feb. 4, 2014

(54) REQUEST PACKET SIZE REDUCTION

(75) Inventor: Shyama Prasad Mondal, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 253 days.

(21) Appl. No.: 13/101,428

(22) Filed: May 5, 2011

(65) Prior Publication Data

US 2012/0284358 A1    Nov. 8, 2012

(51) Int. Cl.
*G06F 15/16* (2006.01)
(52) U.S. Cl.
USPC .............................. 709/227; 726/13
(58) Field of Classification Search
USPC ............ 709/223, 224, 227, 247, 203; 726/23; 370/445; 705/14
See application file for complete search history.

(56) References Cited

U.S. PATENT DOCUMENTS

| 7,610,400 | B2 | 10/2009 | L'heureux et al. |
| 7,937,478 | B2* | 5/2011 | Cheng et al. ............... 709/227 |
| 8,271,636 | B2* | 9/2012 | L'Heureux et al. ............ 709/223 |
| 2004/0083291 | A1* | 4/2004 | Pessi et al. ................ 709/227 |
| 2004/0205249 | A1* | 10/2004 | Berry ....................... 709/247 |
| 2007/0153822 | A1* | 7/2007 | Wang ........................ 370/445 |
| 2008/0098477 | A1* | 4/2008 | Williams et al. ............. 726/23 |
| 2009/0063264 | A1* | 3/2009 | Leung ........................ 705/14 |
| 2010/0223322 | A1* | 9/2010 | Mott et al. .................. 709/203 |
| 2012/0030341 | A1* | 2/2012 | Jensen et al. ............... 709/224 |

OTHER PUBLICATIONS

The Chromium Projects, "Webpage: The Chromium Projects: SPDY", "http://www.chromium.org/spdy", Jul. 21, 2011, p. 1 Publisher: Google, Published in: US.
Tivoli Access Manager for e-business (Revised Nov. 2006), Version 6.0, HTTP data compression, WebSeal, "http://publib.boulder.ibm.com/infocenter/tivihelp/v2r1/index.jsp?topic=%2Fcom.ibm.itame.doc_6.0%2Frev%2Fam60_webseal_admin38.htm", Jul. 14, 2011, p. 4 Publisher: IBM.com, Published in: US.
Belshe, M. and Peon, R., "Webpage: SPDY Protocol (draft-mbelshe-spdy-00)", "http://mbelshe.github.com/SPDY-Specification/draft-mbelshe-spdy-00.xml", 2011, p. 38 Publisher: The IETF Trust, Published in: US.

\* cited by examiner

*Primary Examiner* — Dustin Nguyen
(74) *Attorney, Agent, or Firm* — Neugeboren O'Dowd PC

(57) ABSTRACT

A mobile computing device comprising memory components, a wireless transmitter/receiver, and one or more applications. The mobile computing device utilizes HTTP via the wireless transmitter/receiver to request and receive information from a remote device, wherein the information is to be used by the one or more applications. However, an Accept-Encoding header is not sent with a HTTP GET request when the information comprises one of, an image, audio, video, and flash data.

19 Claims, 3 Drawing Sheets

REQUEST PACKET SIZE REDUCTION

FIELD OF THE INVENTION

The present invention relates to reducing the packet size of a request to receive data from a remote device. In particular, but not by way of limitation, the present inventions relates to reducing the size of a HTTP GET request.

BACKGROUND OF THE INVENTION

Client devices often use HTTP to send and receive data to and from the client device. During such communication exchanges, the client device will send a HTTP GET request for an object located on a remote network device. In a typical HTTP communication, the client device sends all associated headers with the HTTP GET request.

However, network connections for internet-enabled client devices are often asymmetric, so the bandwidth provided to the device for uploading data is lower than the bandwidth provided to the device for downloading data. Therefore, a 1 KB HTTP header in a HTTP GET request may take as much time to upload as 20 KB of HTTP response data takes to download. The actual difference between upload time and download time may be even greater since HTTP request headers are not sent as compressed data, and HTTP response data is often sent as compressed data, so 20 KB of compressed data sent across the network may comprise, for example, 50 KB of uncompressed data at the client device. When a client device sends a HTTP GET request for a small object such as, but not limited to, a 10 KB image, the time it takes to send the request header data may account for a majority of the time it takes to receive the image.

Client device HTTP stacks send an Accept-Encoding header with value gZip for all HTTP GET requests. The Accept-Encoding header indicates that the client accepts compressed content and indirectly asks the server to send the requested object as a gZip compressed object. In such a manner, the amount of content which is transferred over the network is reduced, thereby reducing the time it takes to download the object over the network to the client device. However, since some objects such as, but not limited to, images, are already encoded, compressing such files would not reduce file size and therefore HTTP servers don't compress such files even though the HTTP client device sends the Accept-Encoding:gZip header. Other file types whose size is not reduced upon compression are videos, audios and flash objects. Therefore, sending this header for these content types does not improve the response time, but may actually increase the time to send the request packet.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

One way to reduce the time it takes to receive objects from a remote network device upon sending a request for the object from a client device is to reduce the number of bytes uploaded as request header data. For example, in one embodiment, the present invention may be characterized as a mobile computing device. One mobile computing device may comprise memory components, a wireless transmitter/receiver, and one or more applications using HTTP to request and obtain information via the wireless transmitter/receiver from the remote network device, with the information being used in the one or more applications. However, an Accept-Encoding header is not sent in the HTTP GET request when the information sought comprises an object comprising an image, audio, video, and Flash® data.

Another embodiment of the invention may be characterized as a method of receiving an object using HTTP. One method includes requesting the object comprising one of, an image, audio, video, and Flash® data. The method then includes preventing the issuance of an Accept-Encoding header in a HTTP GET request, and receiving the object Yet another embodiment of the invention may be characterized as a mobile computing system. One mobile computing system comprises a means for a mobile computing device to request an object located on a host device, using HTTP without sending an Accept-Encoding header when the object comprises one of, an image, audio, video, and Flash®. The mobile computing system further comprises a means for the host device to send the object to the mobile computing device.

And another embodiment of the invention comprises a non-transitory, tangible computer readable storage medium, encoded with processor readable instructions to perform a method of requesting an object from a server. In one embodiment, the method comprises determining if the object comprises a substantially uncompressible object type and requesting the object from the server without sending an Accept-Encoding header when the object comprises a substantially uncompressible object type.

BRIEF DESCRIPTION ON THE DRAWINGS

Various objects and advantages and a more complete understanding of the present invention are apparent and more readily appreciated by reference to the following Detailed Description and to the appended claims when taken in conjunction with the accompanying Drawings, where like or similar elements are designated with identical reference numerals throughout the several views and wherein:

DETAILED DESCRIPTION

Figure 1:
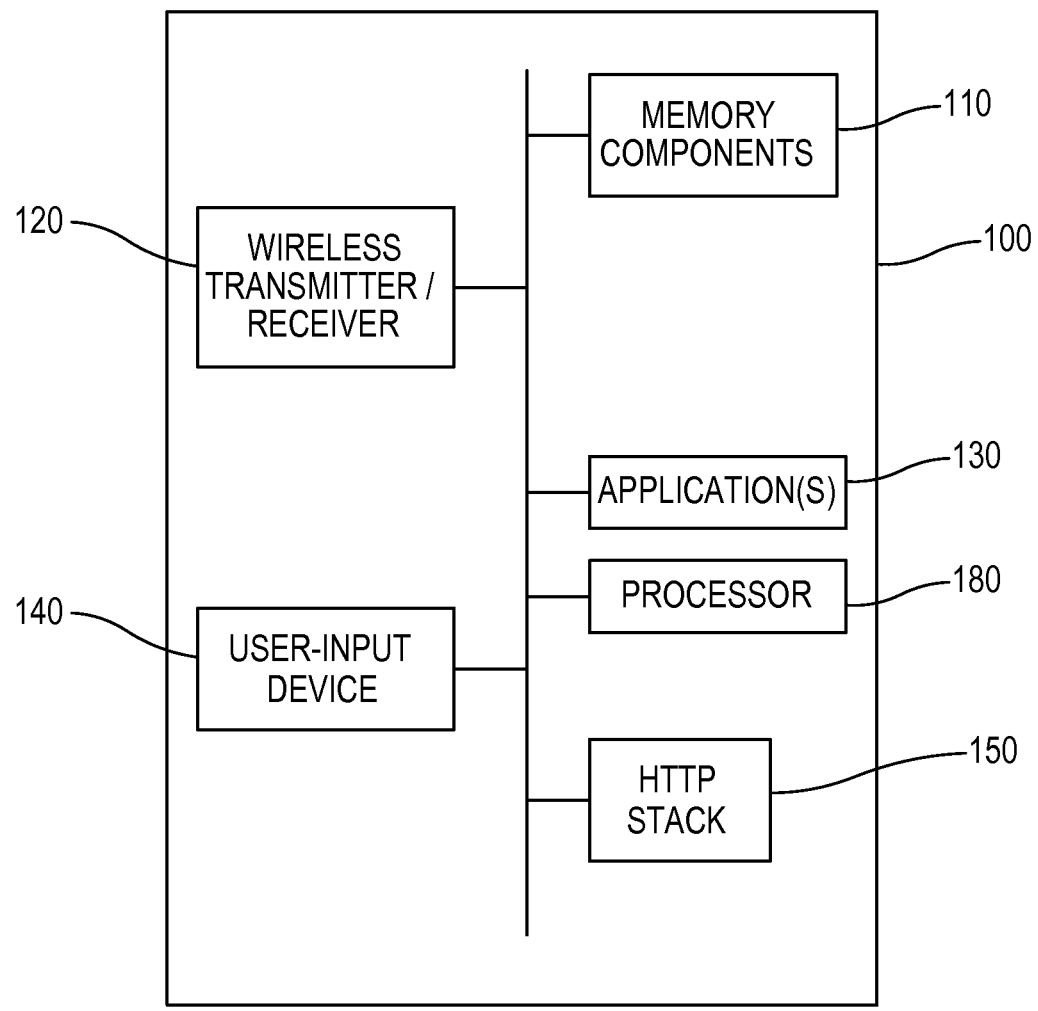
FIG. 1 illustrates a block diagram depicting components of an exemplary embodiment of the present invention.

Referring first to FIG. 1, shown is a mobile computing device 100 comprising memory components 110, a wireless transmitter/receiver 120, and one or more applications 130. The one or more applications 130 may comprise one or more of software and hardware components and may be stored on and/or associated with the memory components 110. However, the one or more application are shown as separate from the memory components 110 in FIG. 1 for ease of use. The mobile computing device 100 may also comprise a user input device 140. One user-input device 140 may comprise a mouse, a touchscreen, or a keypad/keyboard.

In one embodiment, a command may be received from the user-input device 140 to request information be sent to the mobile computing device 100 from a remote device. For example, a user may request to view a web page via one of the one or more applications 130. The webpage may comprise a plurality of resources such as website objects, while one of the one or more applications 130 may comprise a web browser. Other third-party applications may also be used. The request to view the web page may comprise a plurality of HTTP GET requests to download the webpage resources, with the HTTP GET requests being initiated from a HTTP stack 150. The website objects may be located on a web server host device. The remote device may also comprise a plurality of web server hosting devices hosting the plurality of objects.

In one embodiment, the Accept-Encoding HTTP header is not sent with the HTTP GET requests when the information requested comprises one of an image object, an audio object, a video object, and a Flash® object. By not sending the Accept-Encoding header in the request, the size of each HTTP GET request may be reduced by about 25 bytes, great than 25 bytes, or less than 25 bytes. A Flash® object comprises multimedia data used to add animation, video, and interactivity to applications such as, but not limited to, web pages. Flash® content may be displayed on various computer systems and devices using, for example, an Adobe® Flash Player. Flash® is a registered trademark of Adobe Systems Incorporated, 345 Park Avenue, San Jose, Calif. 95110.

The mobile computing device 100 may also comprise an HTTP stack 150. Although the HTTTP stack 150 is shown in FIG. 1 as separate from the wireless transmitter/receiver 120, memory components 110, and the one or more applications 130, it is contemplated that the HTTP stack may actually comprise, be associated with, and/or be electronically coupled to one of more of these other features of the mobile computing device 100. Upon a user selecting to receive and view data in a first of the one or more applications 130, such as, but not limited to, requesting to view an HTML file via a web browser application, a second of the one or more applications 130 comprising a rendering engine such as, but not limited to, WebKit®, may be initiated. The rendering engine may also be referred to as a web rendering engine. The web rendering engine may then parse the information, such as, but not limited to, the HTML file, and may determine whether any portion of the requested information comprises an object mime type comprising at least one of an image, audio, video, and flash data. The rendering engine may then pass the object mime type to the HTTP stack. The HTTP stack then checks the mime type of the requested object and, if the object comprises at least one of an image, audio, video, and flash data, does not send the Accept-Encoding header.

Figure 2:
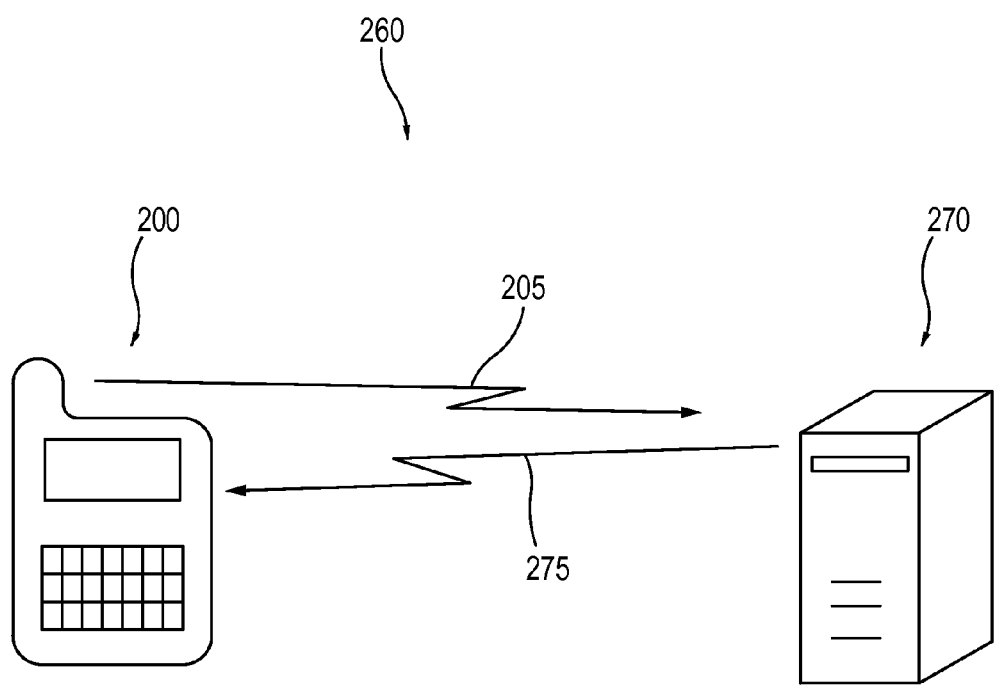
FIG. 2 illustrates communication between a mobile computing device and a server of an exemplary embodiment of the present invention.

Turning now to FIG. 2, seen is a mobile computing system 260. One mobile computing system comprises a mobile computing device 200 comprising a client device, and a host device 270 storing information requested by the mobile computing device 200. One mobile computing device 200 comprises the mobile computing device 100 seen in FIG. 1 and the information requested may comprise one or more webpage objects. One mobile computing system 260 comprises a means for the mobile computing device 200 to request 205 an object located on the host device 270. For example, as described above, and as further provided herein, one request 205 may comprise a user selecting to view information in an application 130—such as, but not limited to, requesting to view an HTML document in a web browser. The HTML document may include various objects located on a plurality of host devices 270. In requesting the HTML document from a host device 270, as well as the objects referenced in the HTML document from various host devices 270 in one embodiment, one application comprising a rendering engine may parse the HTML document and provide each object mime type to an HTTP stack. The HTTP stack then checks the mime type of the object and sends a GET request for the object without sending an Accept-Encoding header when the object type comprises one of an image, audio, video, and flash. Alternatively, the rendering engine may provide the mime type to the HTTP stack when the object mime type comprises an image, audio, video, or flash. The host device 270 may receive the request 205 and provide the object to the mobile computing device 200 through a response 275.

Figure 3:
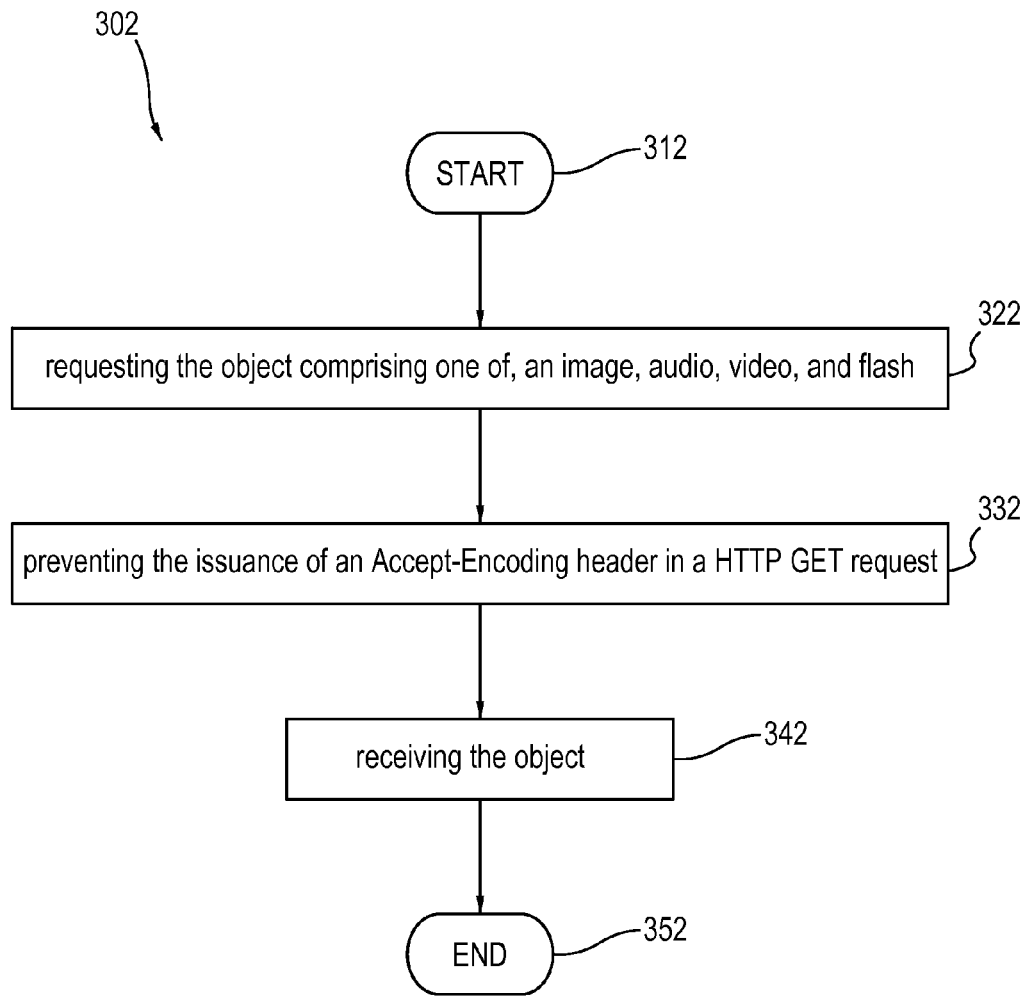
FIG. 3 illustrates a flowchart that depicts a method that may be carried out in connection with the embodiments described herein.

Turning now to FIG. 3, seen is a method 302 of receiving an object using HTTP. One method 302 starts at 312 and at 322 comprises requesting the object. The object may comprise a website object, and in one embodiment comprises an object whose file size is not reduced through compression. Such objects include, but are not limited to an image object, an audio object, a video object, and a flash object. It is contemplated that such a method 302 may be used on conjunction with the mobile computing device 100 of FIG. 1 and the mobile computing system of FIG. 2.

At 332, one method further comprises preventing the issuance of an Accept-Encoding header in a HTTP GET request. As discussed, by not sending the Accept-Encoding header, the size of the HTTP GET request may be reduced by about 25 bytes. Furthermore, the mobile computing device 100 may be adapted to determine an object type for the requested object by, for example, determining the mime type of the object. In one method 302 this may be done through the rendering engine parsing a HTML script for an <img src=> tag that is associated with the object and sending the object mime type to the HTTP stack. The HTTP stack may then determine if the object comprises one of a substantially uncompressible object such as, but not limited to, an audio, video, image, or flash object. For example, although such object types may be compressed, the file size of such objects may not be reduced after compression. Hence, such objects may be referred to throughout the application as uncompressible or substantially uncompressible objects. If the object does not comprise one of these object types, then an Accept-Encoding header is sent in the HTTP GET request. However, if the object does comprise an uncompressible object, then no Accept-Encoding header is provided from the HTTP stack to the host device. Alternatively, an application other than the rendering engine may parse the HTML for the <img src=> tag. For example, the browser or the HTTP stack may be adapted to perform this action and/or otherwise determine an object/mime type. Finally, at 342, the method 302 comprises receiving the object.

One embodiment also comprises a non-transitory, tangible computer readable storage medium, encoded with processor readable instructions to perform a method of requesting an object from a server. For example, returning to FIG. 1, the non-transitory, tangible computer readable storage medium may comprise a portion of the memory components 110 and the method of requesting an object from a server may be performed, at least partially, by a processor 180. Furthermore, the server may comprise the host device 270 seen in FIG. 2. One method comprises determining if the object comprises an uncompressible object, and requesting the object from the server without sending an Accept-Encoding header when the object comprises an uncompressible object. For example, the substantially uncompressible object may comprise one of an audio file, a video file, an image file, and a flash file. In requesting the object from the server without sending an Accept-Encoding header, the size of an HTTP GET request is reduced, thereby allowing for a quicker upload of the request to the server from the mobile computing device 100 and allowing for quicker reception of the object.

In one embodiment, the non-transitory, tangible computer readable storage medium may be further adapted to parse an HTML file. For example, in choosing to view an HTML file in a web browser, the web rendering engine may scan the file to determine an object type. The may involve determining each object's mime type. The rendering engine may then pass the object mime type from to a HTTP stack along with the request for the object.

In conclusion, embodiments of the present invention enable a mobile computing device to more quickly receive requested website objects. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A mobile computing device comprising, memory components;
   one or more applications; and
   a wireless transmitter/receiver using HTTP to request and obtain information from a remote device for use in the one or more applications, wherein,
      an Accept-Encoding header is not sent with a HTTP GET request when the information is determined to comprise a website object mime type whose file size is not reduced through compression prior to sending the HTTP GET request.

2. The mobile computing device of claim 1 wherein, not sending the Accept-Encoding header comprises reducing a size of the HTTP GET request by
   about 25 bytes.

3. The mobile computing device of claim 1 wherein,
   the remote device comprises a plurality of remote devices hosting a plurality of website objects, and
   the mobile computing device fails to send the Accept-Encoding header for each of the plurality of objects.

4. The mobile computing device of claim 1 further comprising,
   a HTTP stack; and wherein,
   the one or more applications comprises,
      a first application comprising a web browser, and
      a second application comprising a rendering engine, wherein, the rendering engine determines whether the website object mime type comprises one of,
         an image,
         audio,
         video, and
         flash.

5. The mobile computing device of claim 4, wherein
   the second application is adapted to pass the website object mime type to the HTTP stack; and
   the HTTP stack,
      reviews the mime type, and
      does not send the Accept-Encoding header when the mime type comprises one of,
         the image,
         the audio,
         the video, and
         the flash.

6. A mobile computing system comprising,
   means for a mobile computing device to request an object located on a host device using HTTP without sending an Accept-Encoding header when the mobile computing device determines that the object comprises a website object mime type whose file size is not reduced through compression; and
   means for the host device to send the website object to the mobile computing device.

7. The mobile computing system of claim 6 further comprising,
   means for determining the object mime type; and
   means for passing the object mime type to a HTTP stack.

8. The mobile computing system of claim 7 further comprising,
   means for the HTTP stack to check the object mime type and not send the Accept-Encoding header when the object mime type comprises one of,
      an image,
      audio,
      video, and
      flash.

9. A method of receiving an object using HTTP comprising,
   requesting the object;
   determining whether the object comprises an object mime type whose file size is not reduced through compression;
   preventing the issuance of an Accept-Encoding header in a HTTP GET request when the object comprises an object mime type whose file size is not reduced through compression; and
   receiving the object.

10. The method of claim 9, further comprising, reducing the size of the HTTP GET request by about 25 bytes.

11. The method of claim 9, further comprising, preventing the issuance of an Accept-Encoding header in a HTTP GET request by,
    parsing an HTML file; and
    determining the object mime type.

12. The method of claim 11 wherein, at least one of parsing an HTML file and determining the object mime type is performed by a rendering engine.

13. The method of claim 12 further comprising, passing the object mime type from the rendering engine to a HTTP stack.

14. The method of claim 9, wherein determining whether an object comprises an object mime type whose file size is not reduced through compression comprises checking a <img src=> tag.

15. A non-transitory, tangible computer readable storage medium, encoded with processor readable instructions to perform a method of requesting an object from a server comprising,
    determining if the object comprises an uncompressible object mime type; and
    requesting the object from the server without sending an Accept-Encoding header when the object mime type comprises an uncompressible object.

16. The non-transitory, tangible computer readable storage medium of claim 15 wherein the uncompressible object mime type comprises one of,
    an audio object mime type;
    a video object mime type;
    an image object mime type; and
    a flash object mime type.

17. The non-transitory, tangible computer readable storage medium of claim 15 wherein requesting the object from the server without sending an Accept-Encoding header comprises reducing the size of an HTTP GET request.

18. The non-transitory, tangible computer readable storage medium of claim 15, wherein the method further comprises, parsing an HTML file.

19. The non-transitory, tangible computer readable storage medium of claim 15 wherein the method further comprises passing the object mime type from a rendering engine to a HTTP stack.

* * * * *